United States Patent [19]

Kawasaki et al.

[11] Patent Number: 5,587,683

[45] Date of Patent: Dec. 24, 1996

[54] BOOSTER CIRCUIT DEVICE

[75] Inventors: Masayuki Kawasaki; Yasunori Kuwasima; Hidehiko Tachibana, all of Ooita; Syuji Katsuki; Akihiro Sueda, both of Yokohama, all of Japan

[73] Assignee: Kabushiki Kaisha Toshiba, Tokyo, Japan

[21] Appl. No.: 350,353

[22] Filed: Dec. 6, 1994

[30] Foreign Application Priority Data

Dec. 9, 1993 [JP] Japan .................... 5-309076

[51] Int. Cl.$^6$ ................ G05F 1/10; G05F 3/02
[52] U.S. Cl. ................ 327/538; 327/121; 327/544; 327/589
[58] Field of Search ................ 327/538, 535, 327/536, 544, 545, 589, 115, 117, 121, 99, 390; 345/212

[56] References Cited

U.S. PATENT DOCUMENTS

| | | | |
|---|---|---|---|
| 3,657,658 | 4/1972 | Kubo | 327/115 |
| 4,883,976 | 11/1989 | Deane | 327/536 |
| 4,894,559 | 1/1990 | Kaneko | 327/589 |
| 5,029,282 | 7/1991 | Ito | 327/536 |
| 5,105,187 | 4/1992 | Plus et al. | 340/811 |
| 5,362,990 | 11/1994 | Alvarez et al. | 327/538 |
| 5,388,084 | 2/1995 | Itoh et al. | 327/538 |

*Primary Examiner*—Timothy P. Callahan
*Assistant Examiner*—My-Trang Nu Ton
*Attorney, Agent, or Firm*—Loeb & Loeb LLP

[57] ABSTRACT

A booster circuit device comprises: a liquid crystal drive circuit (14) whose dissipated current changes; a timing circuit (11) for outputting a select signal according to the dissipated current of the liquid crystal drive circuit; a drive signal select circuit (12) for selecting and outputting any one of at least two drive signals CLK of different frequencies on the basis of the select signal outputted by the timing circuit (11); and a booster circuit (13) for supplying a supply voltage to the liquid crystal drive circuit (14) on the basis of the drive signal CLK outputted by the drive signal select circuit (12). Since any of the drive signals CLK of different frequencies can be selected and applied to the booster circuit (13) according to the dissipated current of the liquid crystal drive circuit (14), it is possible to reduce the current dissipation of the booster circuit, that is the current dissipation of the whole booster circuit device can be reduced markedly.

7 Claims, 9 Drawing Sheets

BOOSTER CIRCUIT DEVICE

BACKGROUND OF THE INVENTION

The present invention relates to a booster circuit device, and more specifically to a booster circuit device suitable for use as a voltage supply for a circuit of small current dissipation such as a liquid crystal driving circuit.

As a circuit related to the present invention, there exists a double booster circuit for driving a liquid crystal as shown in FIG. 1.

In FIG. 1, when a switch SW1 and a switch SW2 are first connected to an a-side contact respectively, a charge Qa1 =Ca×Va is accumulated in a capacitance Ca. After that, when the switch SW1 and the switch SW2 are both connected to a b-side contact respectively, a charge Qa1 is distributed to a capacitance Ca and a capacitance Cb, respectively. Here, if the capacitances Ca and Cb are equal to each other, a voltage Vb1 at an output terminal Vb is the same as a voltage Va.

Successively, when the switch SW1 and the switch SW2 are both connected again to the a-side contact respectively, a charge Qa2=Ca×Va is accumulated in the capacitance Ca, and a charge Qb2=Cb×Va is accumulated in the capacitance Cb.

Further, when the switch SW1 and the switch SW2 are both connected again to the b-side contact respectively, the charge is distributed and an output voltage at the output terminal Vb is Vb=3/2×Va.

When the above-mentioned switching operation is repeated, the output voltage Vbn (n is a 3 or more integer) approaches roughly a voltage of 2×Va gradually.

FIG. 2 shows the same double booster circuit shown in FIG. 1, in which the circuit is composed of MOS transistors. The switch SW1 is composed of a P-channel transistor P3 and an N-channel transistor N1, and the switch SW2 is composed of two P-channel transistors P1 and P2. Further, the operation of both switches SW1 and SW2 is controlled by a control circuit 41 having a level shifter circuit 41a and an inverter INV1. The control circuit 41 operates on the basis of a drive signal CLK applied to the level shifter circuit 41a from the outside.

In this control circuit 41, at the initial condition, a supply voltage Va is applied to only a terminal Va, and an output terminal Vb is set to the ground potential. The P-channel transistor P2 (whose gate is connected to the output terminal of the level shifter circuit 41a) and the P-channel transistor P1 (whose gate is connected to the output terminal of the inverter INV1) are both kept turned on because a low-level is applied to the gates thereof. Therefore, a voltage Va can be outputted from the output terminal Vb.

Under these conditions, when the potential of the drive signal CLK changes to the voltage Va, this voltage Va is applied to the gate of the N-channel transistor N1 of the switch SW1 and an input of the level shifter circuit 41a of the control circuit 41, so that the N-channel transistor N1 and the P-channel transistor P1 are both turned on. These conditions correspond to the status where the switches SW1 and SW2 shown in FIG. 2 are both connected to the a-side contact, respectively.

When the drive signal CLK changes to the ground potential, since the P-channel transistor P2 and the P-channel transistor P3 are both turned on, these conditions correspond to the status where the switches SW1 and SW2 are both connected to the b-side contact, respectively. By repeating the above-mentioned operation, a voltage roughly equal to the voltage 2×Va can be outputted from the output terminal Vb.

FIG. 3 shows an equivalent circuit of a liquid crystal panel. In a display panel 50, a plurality of common pixel electrode signal lines for supplying liquid crystal drive signals COM1 to COMn and a plurality of pixel electrode signal lines for supplying liquid crystal drive signals SEG1 to SEGn are arranged into a matrix pattern. At the respective intersections between both the signal lines, liquid crystal pixels exist, which are denoted as a capacitive load 51, respectively.

FIG. 4(a) shows the operation waveforms of the common pixel electrode signals COM1 to COMn for driving these liquid crystals and the pixel electrode signals SEG1 to SEGn applied to the respective pixel electrodes. Here, Va is a supply voltage given from the outside as already explained, Vb is an output voltage of the double booster circuit, and Vc is an output voltage of a triple booster circuit.

The liquid crystal for one pixel provided at each intersection between the signal lines is set to a light release status when a potential difference between the drive signals SEG and COM becomes the maximum voltage Vc, and to a light shade (non-release) status when the potential difference reaches (Vb–Vc).

Now, the dissipated current $I_{disp}$ of the liquid crystal drive circuit as described above can be expressed as $I_{disp}=f_D \times C_L \times V_D$, because the liquid crystal is a capacitive load, where $f_D$ denotes the frequency of the drive signals COM and SEG; $C_L$ denotes a liquid crystal capacitance; and $V_D$ denotes a display potential. As described above, since the liquid crystal is of capacitive load, current flows only when the potentials of the drive signals SEG and COM change, as shown in FIG. 4(b), so that some current is dissipated.

Further, it is necessary to suppress the output voltage of the booster circuit for supplying the supply voltage to the above-mentioned drive circuit within fluctuations of ±0.1 V, in order to prevent the deterioration of display quality even if the dissipated current of the liquid crystal drive circuit changes largely as at the maximum point. Accordingly, the capacitances Ca and Cb and the frequency $f_D$ of the drive signal of the booster circuit must be determined so that the above-mentioned condition can be satisfied.

Therefore, the dissipated current $I_P$ of the booster circuit shown in FIG. 2 can be expressed as follows:

$$I_P = f_{CLK} \times C_P \times V_P \qquad (1)$$

where $f_{CLK}$ denotes the frequency of the booster drive signal; $C_P$ denotes the parasitic capacitances of the capacitance Ca, the control circuit 41 and the switches SW1 and SW2; and $V_P$ denotes the supply voltage.

As described above, since the magnitude of the dissipated current can be expressed by f×C×V in both the drive circuit and the booster circuit, in order to reduce the fluctuation width of the display supply voltage less than ±0.1 V, the following conditions are required to be satisfied:

Frequency $f_D$ of the drive circuit drive signals COM and SEG
<Frequency $f_{CLK}$ of the booster circuit drive signal  (2)

Liquid crystal capacitance CL<Booster circuit capacitance  (3)

The above-mentioned conditions indicate that the dissipated current of the booster circuit occupies a larger part of the whole dissipated current.

Further, as with the case of the circuit shown in FIG. 5, when a drive signal is applied from a divider circuit 61 to a booster circuit 62 uniformly, since the frequency of the drive signal is constant irrespective of the value of dissipated current $I_{disp}$ as shown in FIG. 6(a), it is impossible to reduce the current dissipation of the liquid crystal drive circuit.

SUMMARY OF THE INVENTION

Accordingly, it is the object of the present invention to provide a booster circuit device which can reduce the current dissipation without deteriorating the display quality of the liquid crystal.

To achieve the above-mentioned object, the present invention provides a booster circuit device, comprising: a current load circuit whose dissipated current changes; a timing circuit for outputting a select signal according to the dissipated current of the current load circuit; a drive signal select circuit for selecting and outputting any one of at least two drive signals of different frequencies on the basis of the select signal outputted by the timing circuit; and a booster circuit for supplying a supply voltage to the current load circuit on the basis of the drive signal outputted by the drive signal select circuit.

In the booster circuit device according to the present invention, since any of the drive signals of different frequencies can selected and applied to the booster circuit according to the dissipated current of the current load circuit (liquid crystal drive circuit), it is possible to reduce the current dissipation of the booster circuit (which occupies the larger part of the whole current dissipation), so that the whole current dissipation of the booster circuit device can be reduced markedly.

DETAILED DESCRIPTION OF THE EMBODIMENTS

The embodiments of the present invention will be described hereinbelow with reference to the attached drawings.

Figure 7:
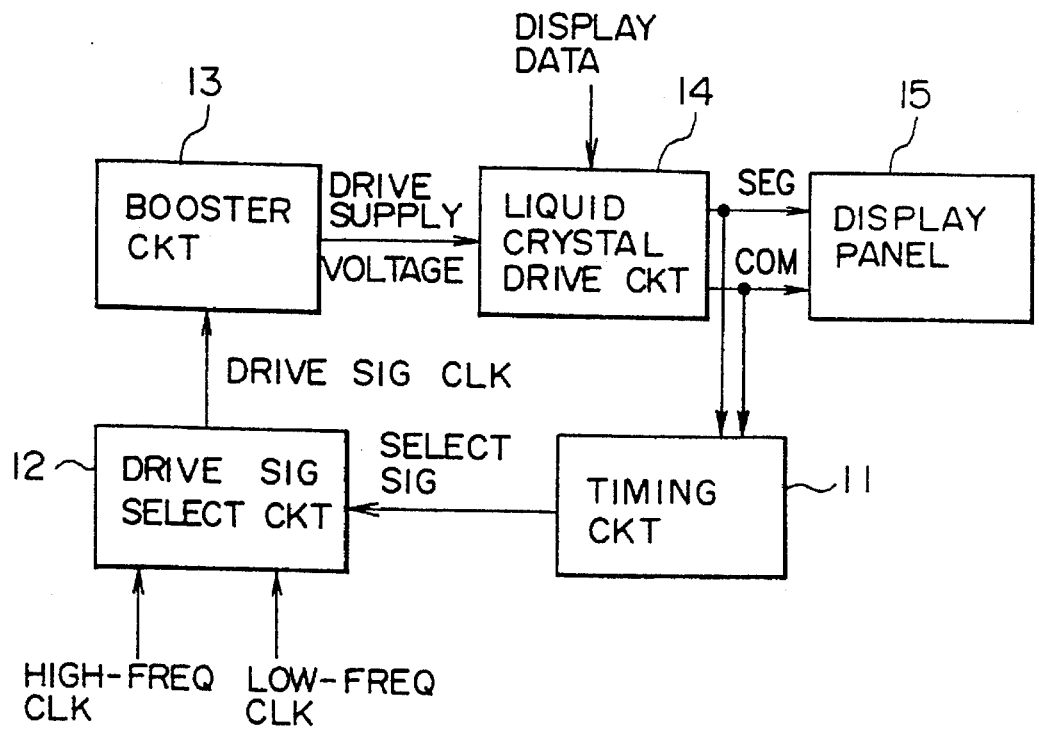
FIG. 7 is a block diagram showing a first embodiment of the booster circuit device according to the present invention.

FIG. 7 shows a first embodiment of the booster circuit device according to the present invention. In FIG. 7, a liquid crystal drive circuit 14 receives data to be displayed on a display panel 15 and transmits the drive signals SEG and COM to the display panel 15 to drive it. A booster circuit 13 boosts a supply voltage (not shown) and supplies the boosted voltage to the liquid crystal drive circuit 14 as a drive supply voltage. Further, this booster circuit 13 is controlled on the basis of a drive signal CLK outputted by a drive signal select circuit 12.

To this drive signal select circuit 12, high and low frequency clocks are inputted. That is, the drive signal select circuit 12 selects any one of the high frequency clock and the low frequency clock as the drive signal CLK on the basis of a select signal applied by a timing circuit 11 and outputs the selected drive signal CLK to the booster circuit 13.

Figure 8:
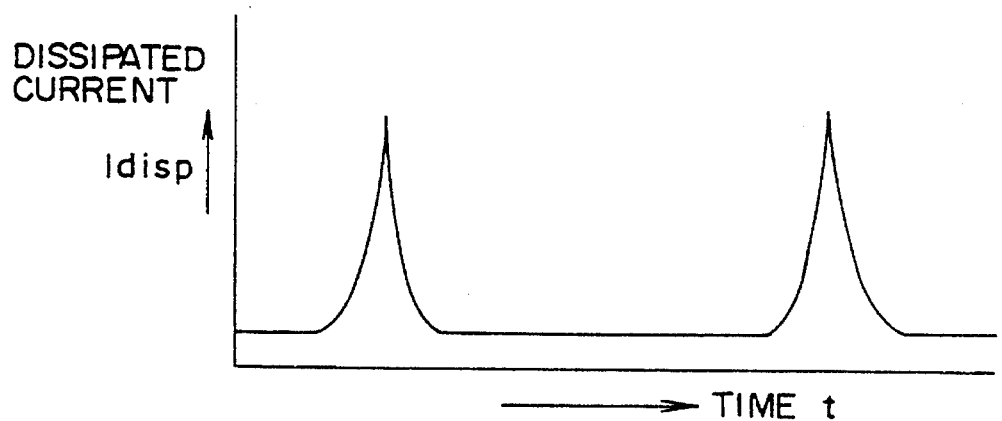
FIGS. 8(a) and (b) are timing chart showing the relationship between the dissipated current and the drive signal CLK of the booster circuit device shown in FIG. 7.
Figure 8:
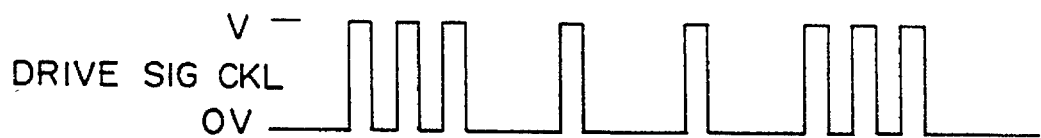

As shown in FIGS. 8(a) and (b), the timing circuit 11 outputs the select signal to the drive signal select circuit 12 in such a way that the high frequency clock can be outputted by the drive signal select circuit 12 as the drive signal CLK when the dissipated current $I_{disp}$ of the liquid crystal circuit 14 is large but the low frequency clock can be outputted by the drive signal select circuit 12 as the drive signal CLK when the dissipated current $I_{disp}$ of the liquid crystal circuit 14 is small. In other words, when the potentials of the drive signals SEG and COM outputted by the liquid crystal drive circuit 14 change, since the dissipated current $I_{disp}$ of the liquid crystal drive circuit 14 becomes large, the timing circuit 11 outputs the select signal according to the change in potential of these signals SEG and COM.

By changing the frequency of the drive signal CLK applied to the booster circuit 13 according to the magnitude of the dissipated current $I_{disp}$ of the liquid crystal drive circuit 14 as described above, it is possible to reduce the current dissipation of the booster circuit 13. As already explained, since the current dissipated by the booster circuit 13 occupies a larger part of the current dissipation of the whole circuit device, the current dissipation can be reduced markedly as a whole.

Figure 9:
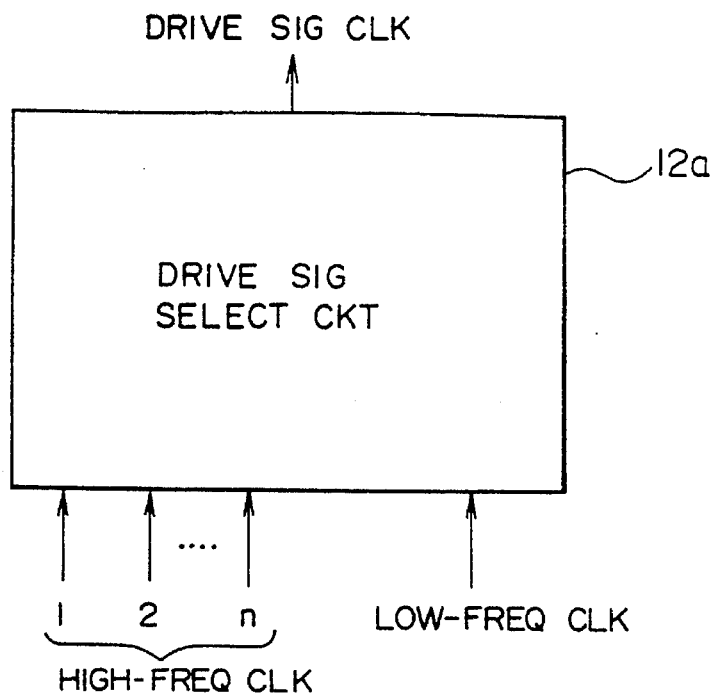
FIG. 9 is a block diagram showing the drive signal select circuit of a second embodiment of the booster circuit device according to the present invention.

FIG. 9 shows a second embodiment of the booster circuit device according to the present invention, in which only a drive signal select circuit 12a is shown. In this drive signal select circuit 12a, a plurality of high frequency clocks 1, 2, . . . , n (n denotes an integer greater than or equal to one) of different frequencies are inputted together with the low frequency clock, as compared with the drive signal select circuit 12 of the first embodiment shown in FIG. 7. Further, any one of the high frequency clocks 1, 2, ..., n and the low frequency clock are selected and outputted on the basis of the select signal given by the timing circuit 11. In the same way as with the case of the first embodiment, since the magnitude of the dissipated current of the liquid crystal drive circuit 14 differs according to change in level of the drive signals SEG and COM outputted by the liquid crystal drive circuit 14, when the dissipated current is large, the maximum frequency clock n is selected; and when the dissipated current is small, the low frequency clock is selected. In the intermediate region, any one of the high frequency clocks 1, 2, ..., n−1 is selected according to the magnitude of the dissipated current.

Figure 10:
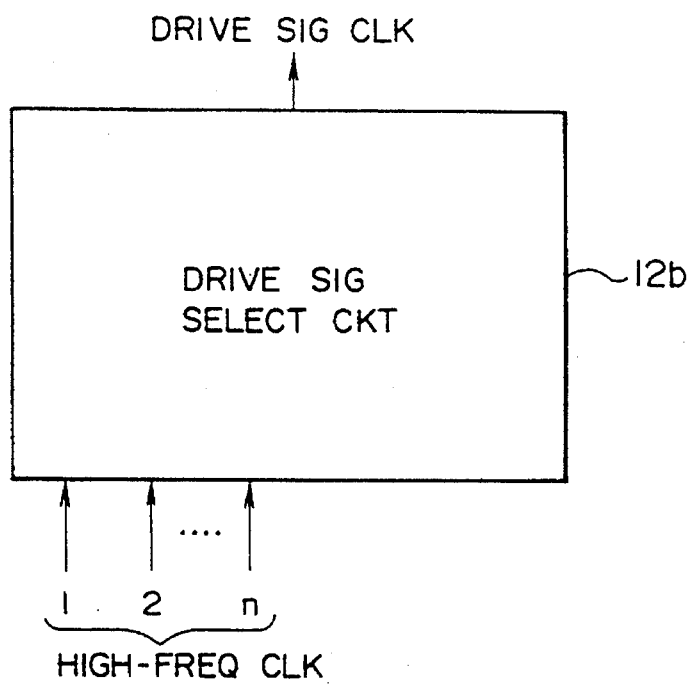
FIG. 10 is a block diagram showing the drive signal select circuit of a third embodiment of the booster circuit device according to the present invention.

FIG. 10 shows a third embodiment of the booster circuit device according to the present invention, in which only the drive signal select circuit 12b is shown. In this drive signal select circuit 12b, a plurality of high frequency clocks are inputted, without inputting the low frequency clock. Further, when the levels of the drive signals SEG and COM do not change and thereby the dissipated current of the liquid crystal drive circuit 14 is small, the operation of the booster circuit 13 is interrupted to reduce the dissipated current. That is, when the dissipated current is small, the drive signal select circuit 12b gives a drive signal whose level is fixed to the booster circuit 13 on the basis of the select signal of the timing circuit 11, so that the booster circuit 13 can be interrupted. On the other hand, when the dissipated current is large, an optimum one of a plurality of the high frequency clocks inputted to the drive signal select circuit 12b is selected as the drive signal CLK and then outputted to the booster circuit 13.

Figure 4A:
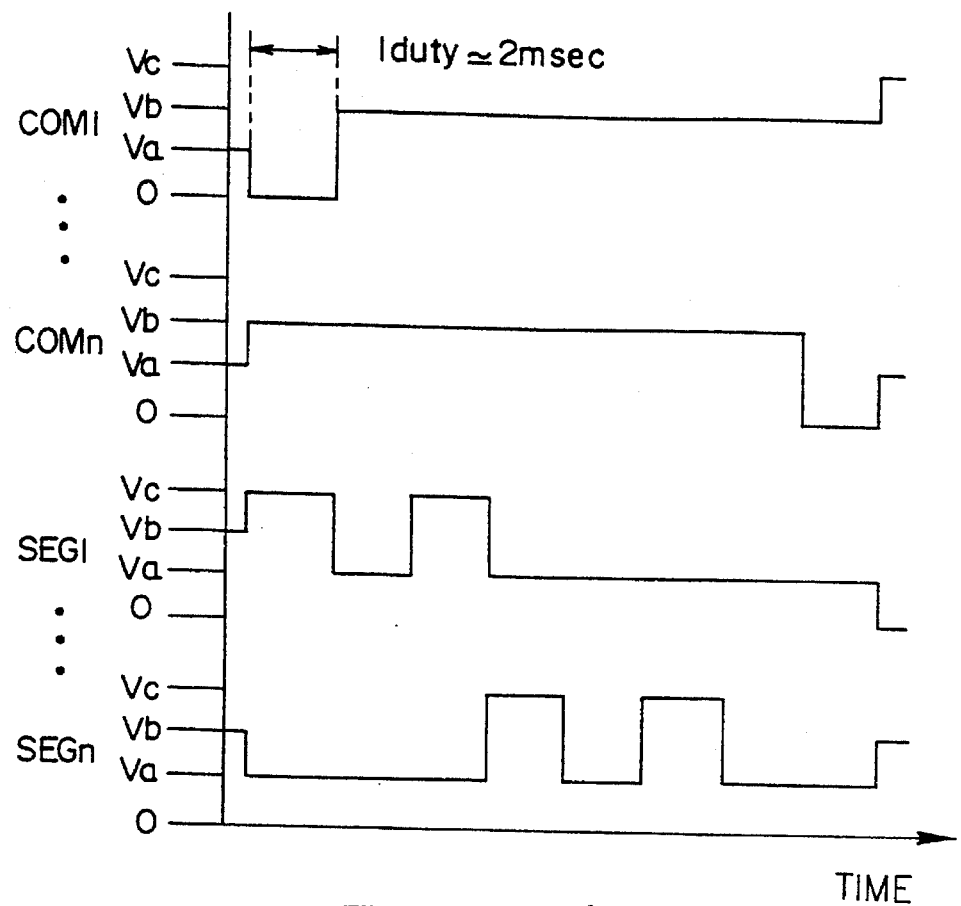
FIGS. 4(a) and (b) are timing chart showing the relationship between the signals for driving the liquid crystal display panel shown in FIG. 3 and the dissipated current of the liquid crystal drive circuit.
Figure 4B:
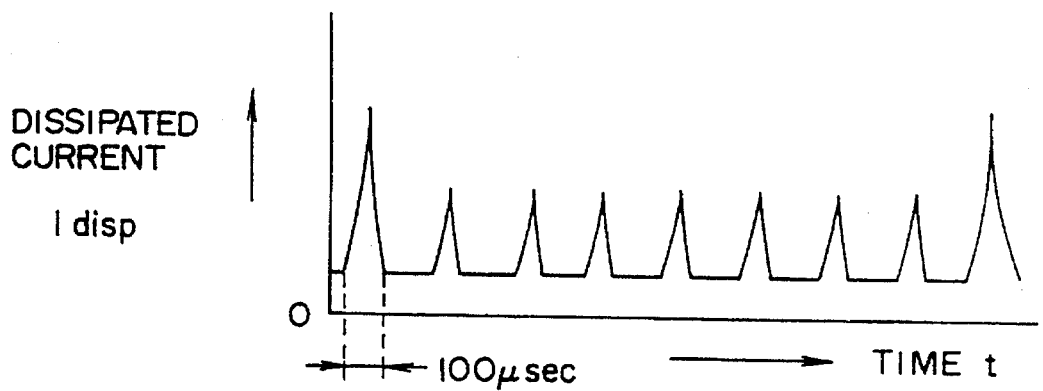
Figure 5:
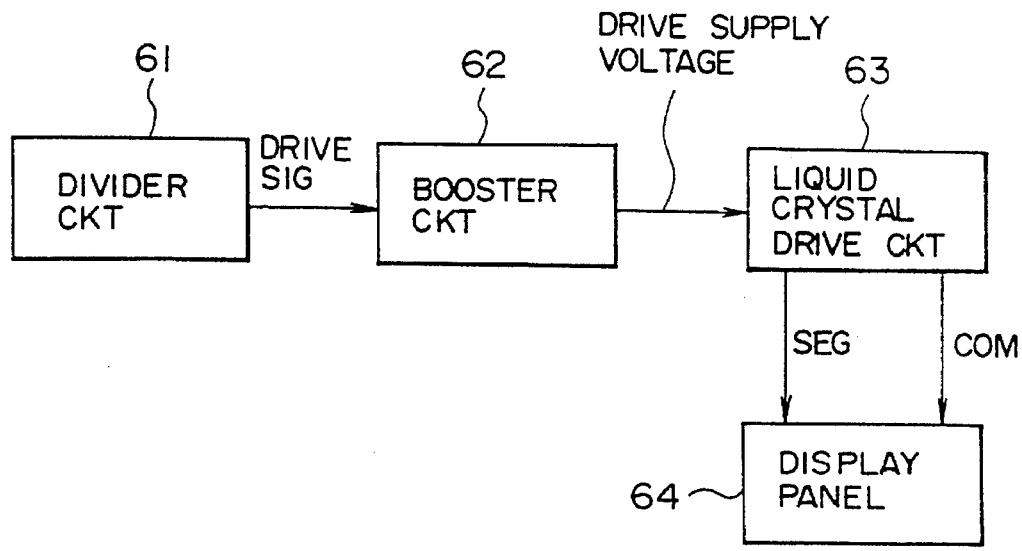
FIG. 5 is a circuit diagram showing another booster circuit device related to the present invention.
Figure 6:
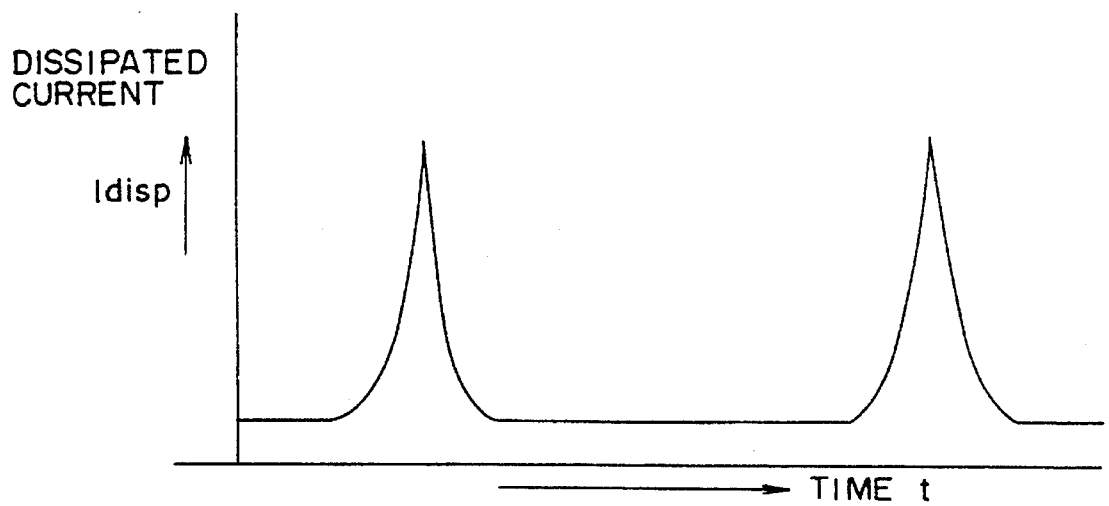
FIGS. 6(a) and (b) are timing chart showing the relationship between the dissipated current of the liquid crystal drive circuit shown in FIG. 5 and the signal applied to the booster circuit.
Figure 6:
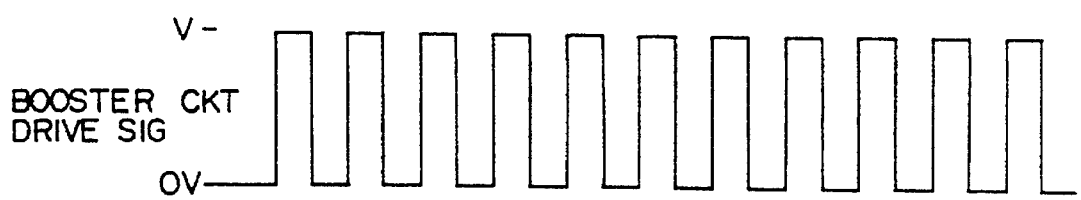

Here, the pulse widths (duty) of the drive signals SEG and COM for driving the display panel 15 change according to the potentials thereof. In the case where the drive signals COM1 to COMn and SEG1 to SEGn have three different levels, respectively as shown in FIG. 4(a), the pulse width (duty) thereof is about 2 msec, respectively. Therefore, the levels of the drive signals COM1 to COMn and SEG1 to SEGn change at a period of about 2 msec. Further, the dissipated current $I_{disp}$ of the liquid crystal drive circuit 14 increases for a period of about 100 μsec, as shown in FIG. 4(b), whenever the drive signals COM1 to COMn and SEG1 to SEGn change, respectively.

In this third embodiment, when the levels of the drive signals COM1 to COMn and SEG1 to SEGn do not change and thereby the dissipated current is small, since the boosting operation is interrupted, it is possible to suppress the current dissipation of the booster circuit 14 as small as about 1/20.

Figure 11:
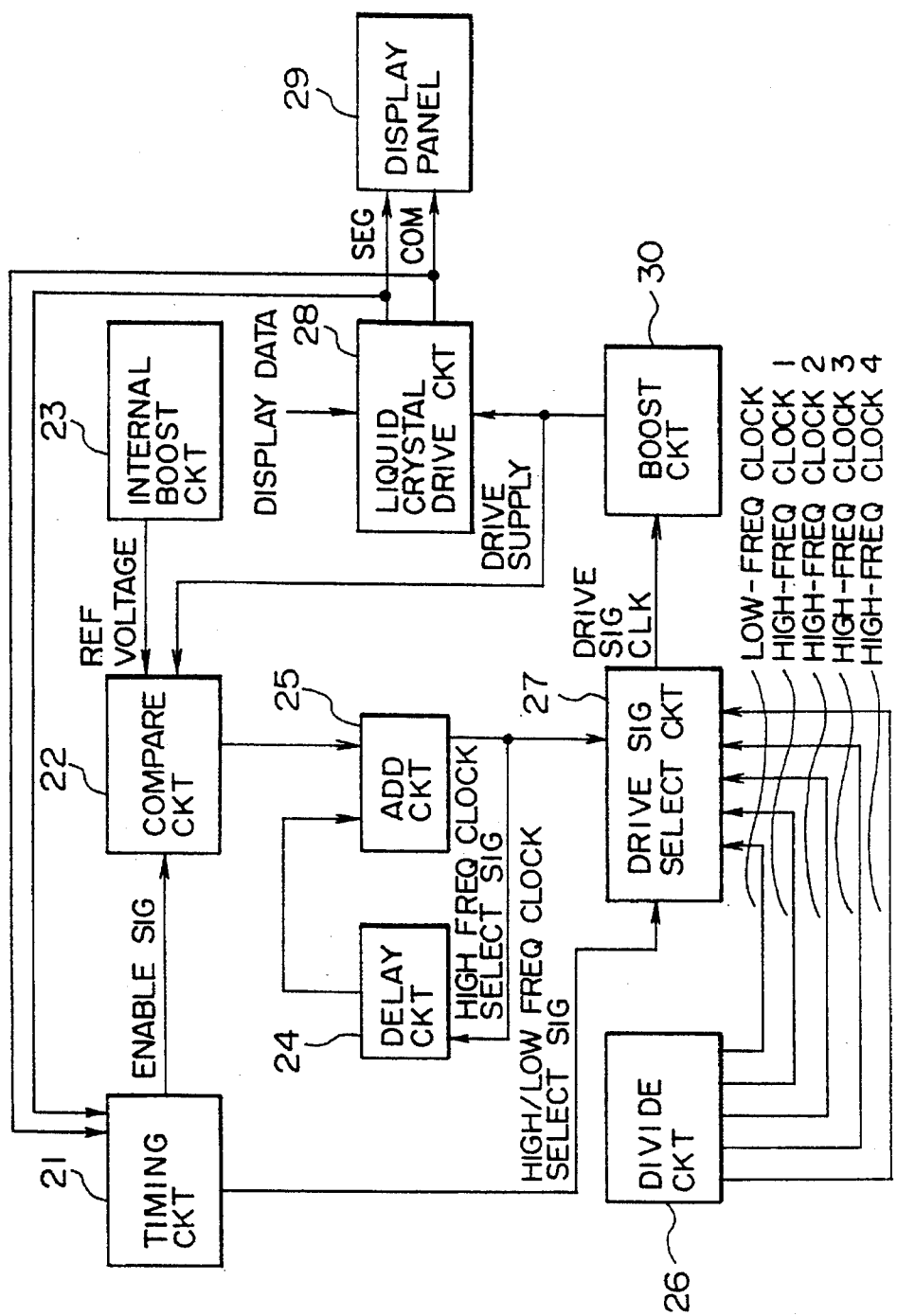
FIG. 11 is a block diagram showing a fourth embodiment of the booster circuit device according to the present invention.

FIG. 11 shows a fourth embodiment of the booster circuit device according to the present invention. In this embodiment, the display quality can be improved in addition to the suppression of the current dissipation. As already explained, when the drive supply voltage supplied by the booster circuit fluctuates violently, the display quality deteriorates. Therefore, it is necessary to suppress the fluctuation width of the drive supply voltage less than ±0.1 V, so that it is preferable to increase the frequency of the drive signal CLK applied to the booster circuit 30.

Therefore, in this embodiment, when an image is displayed on the display panel 29, that is, when the dissipated current of the liquid crystal drive circuit 28 is large, one of the drive signals CLK of higher frequencies is applied to the booster circuit 30 appropriately according to the magnitude of the dissipated current. Further, when the dissipated current is small and constant, the drive signal CLK of low frequency is applied to the booster circuit 30. Accordingly, it is possible to suppress the current dissipation of the booster circuit 30 and further to prevent the display quality deterioration.

In this embodiment, the circuit device comprises a comparator circuit 22, a delay circuit 24, an adder circuit 25 and a divider circuit 26, in addition to a display panel 29, a liquid crystal drive circuit 28, an internal booster circuit 23, a booster circuit 30, a drive signal select circuit 27, and a timing circuit 21.

The divider circuit 26 outputs the low frequency clock and the high frequency clocks 1 to 4 of different frequencies on the basis of a reference clock. These divided low and high frequency clocks are given to the drive signal select circuit 27. On the basis of high/low frequency clock select signals outputted by the timing circuit 21, the drive signal select circuit 27 selects either of the low frequency clock or the high frequency clocks 1 to 4. Further, when the high frequency clocks 1 to 4 are selected, any one of the high frequency clocks 1 to 4 is selected on the basis of a high frequency clock select signal outputted by the adder circuit 25.

Here, the high frequency clock select signal can be generated as follows: the timing circuit 21 outputs the low frequency clock select signal when an image is not displayed on the display panel 29 but the high frequency clock select signal when an image is displayed. In practice, when the levels of the drive signals SEG and COM given from the liquid crystal drive circuit 28 to the display panel 29 change and thereby the dissipated current of the liquid crystal drive circuit 28 increases as described above, the high frequency clock select signal is outputted by the timing circuit 21. In this case, an enable signal is further outputted from the timing circuit 21 to the comparator circuit 22.

The comparator circuit 22 compares the drive supply voltage outputted by the booster circuit 30 with a reference voltage outputted by the internal booster circuit 23, and gives the compared result to the adder circuit 25. When the drive supply voltage outputted by the booster circuit 30 is not yet sufficiently high and therefor lower than the reference voltage, the comparator circuit 22 outputs an addition command to the adder circuit 25. In response to this addition command, the adder circuit 25 outputs a high frequency clock select signal to the drive signal select circuit 27 so that high frequency clocks 1, 2, ... can be selected in sequence beginning from the first high frequency clock 1 via the delay circuit 24. When the frequency of the drive signal CLK outputted by the drive signal select circuit 27 to the booster circuit 30, the current supply capability of the booster circuit 30 increases, with the result that it is possible to improve the display quality.

When the drive supply voltage is boosted sufficiently high up to the reference voltage, the comparator circuit 22 outputs an addition interrupt command to the adder circuit 25, so that the high frequency clock obtained at this time point is outputted from the drive signal select circuit 27 to the booster circuit 30.

As described above, when an image is displayed on the display panel 29, the high frequency drive signal CLK is applied from the drive signal select circuit 27 to the booster circuit 30 to improve the display quality; and when not displayed, the low frequency drive signal CLK is applied from the drive signal select circuit 27 to the booster circuit 30 to reduce the current dissipation of the booster circuit 30.

In other words, since the drive signal CLK of an optimum frequency can be given to the booster circuit 30 according to the respective situations, it is possible to improve the display quality and reduce the current dissipation at the same time.

Figure 12:
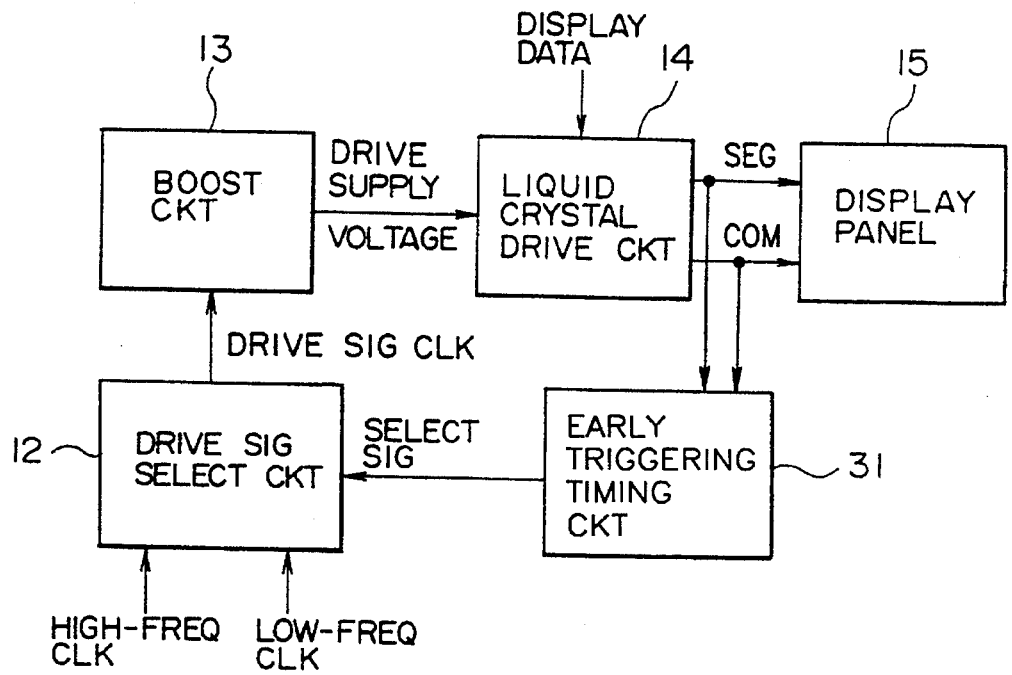
FIG. 12 is a block diagram showing a fifth embodiment of the booster circuit device according to the present invention.

FIG. 12 shows a fifth embodiment of the booster circuit device according to the present invention. The object of this embodiment is to stabilize the potential of the drive supply voltage outputted by the booster circuit for improvement of display quality. In comparison with the first embodiment shown in FIG. 7, the way of forming the select signal outputted from a timing circuit 31 to the drive signal select circuit 12 is different.

Figure 13:
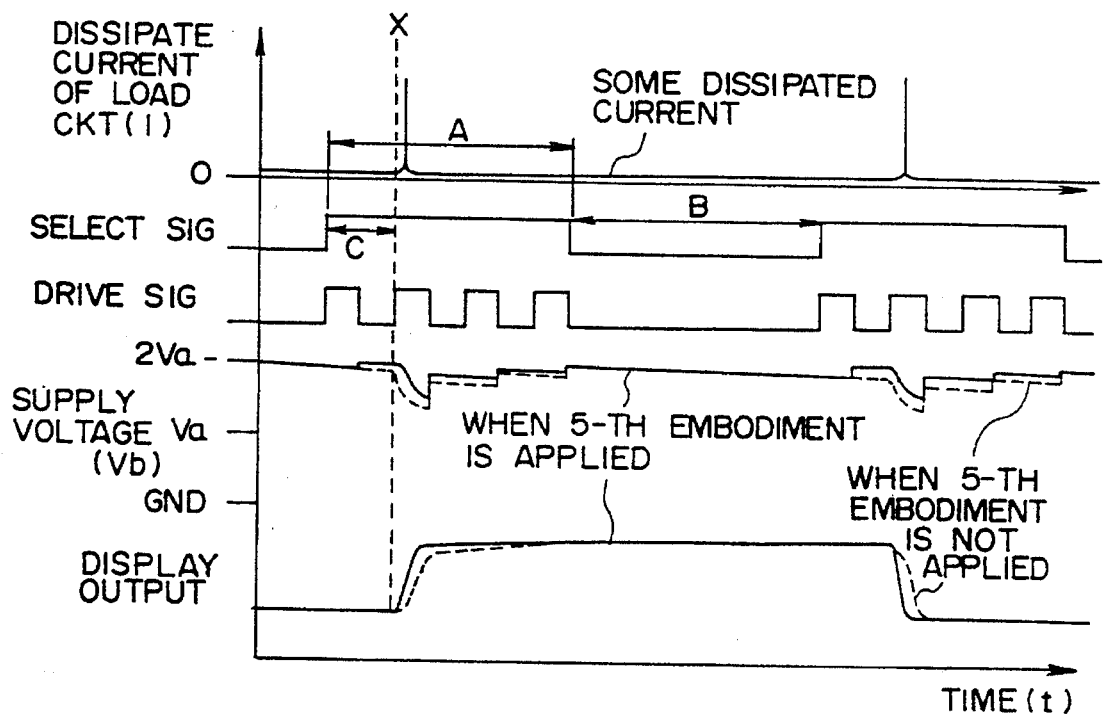
FIG. 13 is a timing chart showing the relationship among the dissipated current, select signal, drive signal, drive supply voltage, and display output of the booster circuit device shown in FIG. 12.

FIG. 13 shows the relationship among the dissipated current of the liquid crystal drive circuit 14, the select signal outputted by the timing circuit 31, the drive signal CLK outputted by the drive signal select circuit 12, the drive supply voltage outputted by the booster circuit 13, and the display output of the display panel 15. In FIG. 13, the period B is a time interval during which the drive signals SEG and COM given to the display panel 15 do not change and further some dissipated current exists in the liquid crystal drive circuit 14.

In FIG. 13, the dissipated current increases at a time point X. This time point X corresponds to a time point when the levels of the drive signals SEG and COM given to the display panel 15 change.

In the case of the first to fourth embodiments, in a predetermined period (during which an image is displayed) after the time point X, the select signal changes to the high level, and therefore the drive signal CLK is outputted. In this case, the drive supply voltage cannot immediately reach a necessary level (as shown by dashed lines), so that it takes a time until the display output reaches a required level.

In comparison with this, in this fifth embodiment, the select signal changes to the high level at a time point earlier than the time point X by a period C, and the drive signal CLK is outputted beginning from this time point. Here, it is preferable to determine the period C to be longer than a half period of the drive signal. As described above, when the drive signal CLK is given to the booster circuit 13 earlier by the period C, it is possible to allow the level of the drive supply voltage (dropped during the period B) to reach a sufficient high level at the time point X. As a result, it is possible to improve the response characteristics of the display output.

Figure 14:
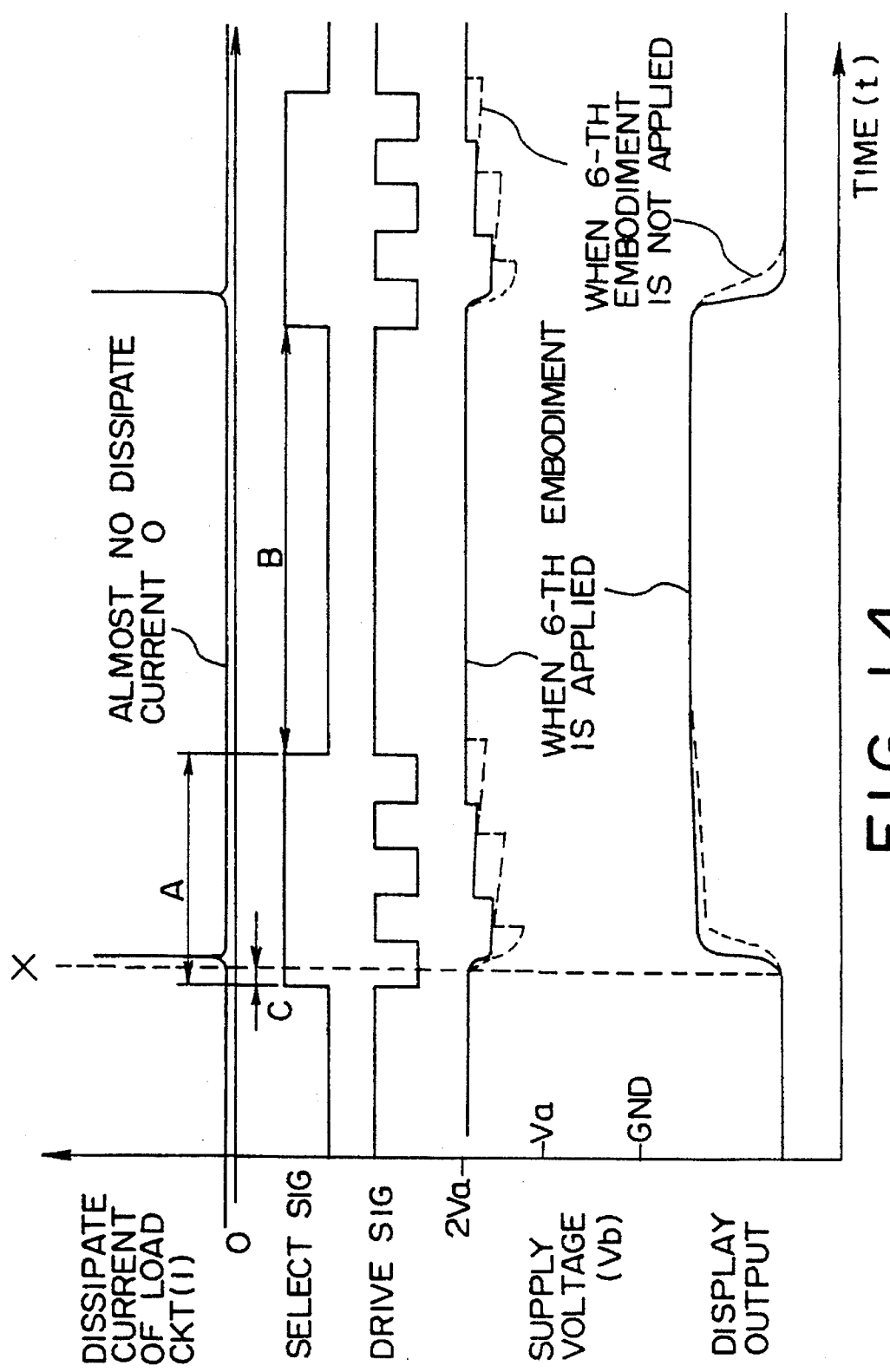
FIG. 14 is a timing chart showing the relationship among the dissipated current, select signal, drive signal, drive supply voltage and display output of a sixth embodiment of the booster circuit device according to the present invention.

FIG. 14 shows a timing chart for assistance in explaining a sixth embodiment of the booster circuit device according to the present invention. This embodiment is applied when the dissipated current is extremely small during the period B. In this sixth embodiment, the drive signal CLK is outputted beginning from a time point earlier than the time point X by a short period C (than that of the fifth embodiment). This short period C is determined to be shorter than at least a half period of the drive signal CLK.

Figure 1:
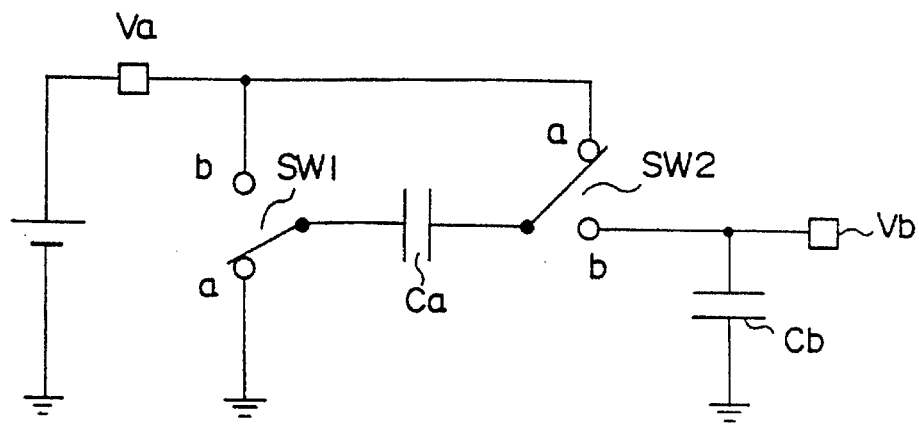
FIG. 1 is a circuit diagram showing a booster circuit device related to the present invention.
Figure 2:
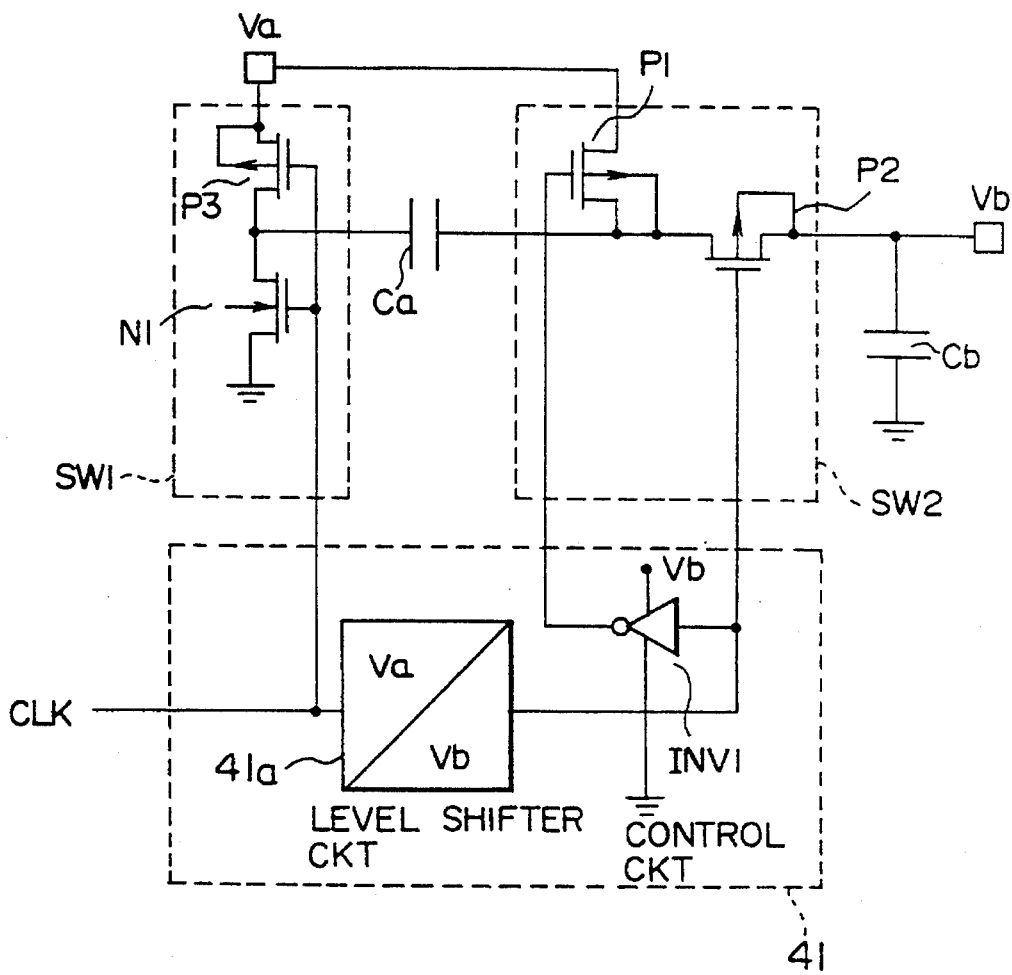
FIG. 2 is a circuit diagram showing a more detailed circuit construction of the booster circuit device shown in FIG. 1.
Figure 3:
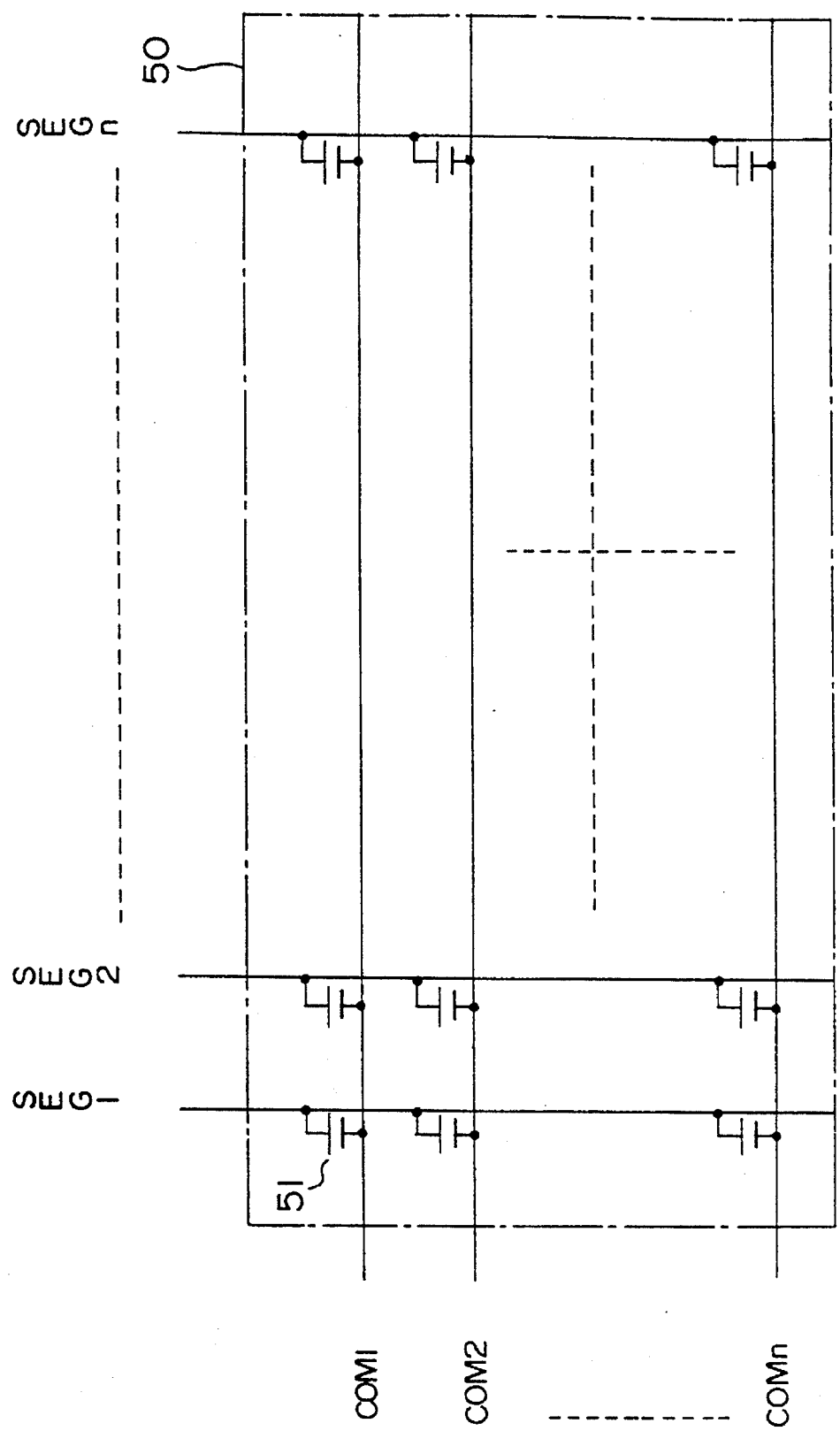
FIG. 3 is a circuit diagram showing an equivalent circuit of the liquid crystal panel.

Further, in the fifth embodiment, during the period B during which the dissipated current is small to some extent, the drive signal CLK is kept at the low level to reduce the dissipated current. In this sixth embodiment, however, during this period B, the drive signal CLK is kept at the high level. Therefore, it is possible to obtain such a status that in FIG. 1, the switches SW1 and SW2 are both connected to the b-side contact, respectively and thereby the voltage of 2Va can be outputted by the capacitances Ca and Cb. Therefore, it is possible to keep the level of the drive supply voltage at the high level during the period B. In other words, even if the period C during which the drive signal CLK is outputted is short, since the drive supply voltage reaches a sufficiently high boosted voltage level at the time point X, it is possible to obtain a high response characteristics of the display output.

The above-mentioned embodiments have been explained only by way of examples. Therefore, without being limited only thereto, various modifications may be made in the present invention. For instance, the drive signal CLK selected by the drive signal select circuit on the basis of the select signals given by the timing circuit can be selected from two or more signals of different frequencies.

What is claimed is:

1. A booster circuit device comprising:

a liquid crystal drive circuit for outputting a signal to a liquid crystal display panel;

a timing circuit for outputting a select signal responsive to changes in the signal outputted by the liquid crystal drive circuit, wherein the timing circuit outputs a high frequency clock select signal in response to a high current demand in the liquid crystal drive circuit when the signal outputted by the liquid crystal drive circuit changes, and outputs a low frequency clock select signal in response to a low current demand in the liquid crystal drive circuit when the signal outputted by the liquid crystal drive circuit does not change;

a drive signal select circuit for selecting a low frequency clock having a first frequency when said timing circuit outputs the low frequency clock select signal, and for selecting any one of at least two high frequency clocks having frequencies higher than the first frequency when said timing circuit outputs the high frequency clock select signal, the selected clock being outputted as a drive signal;

a booster circuit for supplying a supply voltage to said liquid crystal drive circuit on the basis of the drive signal outputted by said drive signal select circuit; and control means for comparing the supply voltage outputted by said booster circuit with a reference voltage when the said timing circuit outputs the high frequency clock select signal, and for controlling said drive signal select circuit to sequentially select a higher frequency clock than a previously selected high frequency clock from the at least two high frequency clocks until the supply voltage reaches the reference voltage.

2. A booster circuit device comprising:

a liquid crystal drive circuit, responsive to a drive supply voltage, for generating and outputting a drive signal to a liquid crystal display panel;

a timing circuit for outputting a low frequency clock select signal when no image is displayed on the liquid crystal display panel and a high frequency clock select signal and a comparison enable signal when an image is displayed on the liquid crystal display panel;

a reference voltage generating circuit for outputting a reference voltage;

a booster circuit for generating and outputting the drive supply voltage to said liquid crystal drive circuit;

a comparator circuit for comparing the drive supply voltage outputted by said booster circuit with the reference voltage outputted by said reference voltage generating circuit when said timing circuit outputs the comparison enable signal, and outputting an addition command when the drive supply voltage is lower than the reference voltage but outputting an addition-stop command when the drive supply voltage reaches the reference voltage;

an adder circuit for first outputting a first high frequency clock select signal to select a first high frequency clock having the lowest frequency among the high frequency clocks when said comparator circuit outputs the addition command, successively outputting an i-th (where i is an integer between 1 and n, where n is greater than or equal to 2) high frequency clock select signal to select an i-th high frequency clock having the higher frequency in the high frequency clocks in sequence in the order of second, . . . , i-th, . . . , n-th higher frequency clocks at predetermined time intervals while said comparator circuit is outputting the addition command, and finally outputting a current i-th high frequency clock select signal at the time when said comparator circuit outputs the addition-stop command; and a drive signal select circuit for outputting the low frequency clock or any of the first, second, . . . , i-th, . . . , n-th high frequency clocks, the low frequency clock signal being outputted and applied to said booster circuit when said timing circuit outputs the low frequency clock select signal, and the i-th high frequency clock signal being outputted and applied to the booster circuit on the basis of the i-th high frequency clock select signal outputted by said adder circuit when said timing circuit outputs the high frequency clock select signal.

3. The booster circuit device of claim 2, which further comprises a delay circuit, and wherein when said comparator circuit is outputting the addition command, the i-th high frequency clock select signal outputted by said adder circuit is inputted to both said drive signal select circuit and said delay circuit; after a predetermined time interval has elapsed, the i-th high frequency clock select signal inputted to said delay circuit are given to said adder circuit to increment the i-th high frequency clock select signal so that the (i+1)-th high frequency clock select signal are outputted to both said drive signal select circuit and said delay circuit.

4. The booster circuit device according to claim 2, which further comprises a divider circuit for receiving a reference clock, generating and outputting the low frequency clock and the first, second, . . . , i-th, . . . , n-th high frequency clocks on the basis of the reference clock to the drive signal select circuit.

5. A booster circuit device operable with a plurality of different frequency clock signals and a reference voltage, the booster circuit device comprising:

a liquid crystal drive circuit responsive to a drive supply voltage for outputting a signal to a display;

a timing circuit that generates a first select signal which is responsive to change in the signal outputted by the liquid crystal drive circuit, wherein the timing circuit outputs the first select signal corresponding to a high current demand in the liquid crystal drive circuit when the signal outputted by the liquid crystal drive circuit changes, and outputs the first select signal corresponding to a low current demand in the liquid crystal drive circuit when the signal outputted by the liquid crystal drive circuit does not change;

a drive signal select circuit that selects and outputs one of a plurality of different frequency clock signals in response to the first select signal from the timing device, wherein a high frequency clock signal is selected from the plurality of different frequency clock signals when the first select signal corresponds to a high current demand in the liquid crystal drive circuit, and a low frequency clock signal is selected from the plurality of different frequency clock signals when the first select signal corresponds to a low current demand in the liquid crystal drive circuit;

a comparator circuit that compares the reference voltage and the drive supply voltage and produces a second select signal to the drive signal select circuit to select a different one of the plurality of different frequency clock signals; and a booster circuit that produces the drive supply voltage to the liquid crystal drive circuit, wherein the level of the drive supply voltage corresponds to the frequency of the selected one of the plurality of different frequency clock signals.

6. The booster circuit device according to claim 5, wherein if the reference voltage is greater than the drive supply voltage, the drive signal select circuit outputs a higher frequency clock signal from the plurality of different frequency clock signals pursuant to the second select signal from the comparator device.

7. The booster circuit device according to claim 5, wherein the timing circuit outputs the select signal at a predetermined time period earlier than at a time in which a high current demand from the liquid crystal drive circuit is detected.

* * * * *